US008354949B2

(12) United States Patent
Thissen et al.

(10) Patent No.: US 8,354,949 B2
(45) Date of Patent: Jan. 15, 2013

(54) REMOTE CONTROL CODES

(75) Inventors: Rogier Louis Jacques Willem Thissen, Louvain (BE); Michael Walter Paul D'Hoore, Louvain (BE); Lucas Griet Johan Hellemans, Louvain (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 209 days.

(21) Appl. No.: 12/918,091

(22) PCT Filed: Feb. 17, 2009

(86) PCT No.: PCT/IB2009/050636
§ 371 (c)(1), (2), (4) Date: Aug. 18, 2010

(87) PCT Pub. No.: WO2009/107029
PCT Pub. Date: Sep. 3, 2009

(65) Prior Publication Data

US 2010/0328134 A1 Dec. 30, 2010

(30) Foreign Application Priority Data

Feb. 25, 2008 (EP) .................................... 08151871

(51) Int. Cl.
*H04L 17/02* (2006.01)

(52) U.S. Cl. ....................................................... 341/176

(58) Field of Classification Search .................. 341/176; 348/734; 340/12.28, 13.24, 13.25
See application file for complete search history.

(56) References Cited

U.S. PATENT DOCUMENTS

| | | | |
|---|---|---|---|
| 5,691,710 | A | 11/1997 | Pietraszak et al. |
| 6,008,735 | A | 12/1999 | Chiloyan et al. |
| 7,170,422 | B2 * | 1/2007 | Nelson et al. .............. 340/12.28 |
| 8,031,270 | B1 * | 10/2011 | Wisniewski et al. .......... 348/734 |
| 2003/0234737 | A1 | 12/2003 | Nelson et al. |

FOREIGN PATENT DOCUMENTS

| | | | |
|---|---|---|---|
| WO | 03083801 | A2 | 10/2003 |
| WO | 03100534 | A2 | 12/2003 |
| WO | 2007105142 | A1 | 9/2007 |

* cited by examiner

*Primary Examiner* — Steven J Mottola

(57) ABSTRACT

An apparatus, such as a database or a processor/memory combination of a remote control system, for supplying for example infrared codes defining functions for remotely controlling devices wherein code-sets include function-code-combinations for each one of two/more different functions. By distinguishing main-functions such as power on/off and sub-functions such as channel up/down and volume up/down, code-sets may be allocated to a group of code-sets for a target device in case a code of a function-code-combination for the main-function is valid for the target device. This increases an efficiency of the apparatus. The group of code-sets may form a tree, whereby the main-function and its code(s) form root of the tree, whereby a sub-function forms a branch of the tree and a code or cedes defining this sub-function form a leaf or leaves of the branch. The group of code-sets may be defined for device-types and/or device-brands.

19 Claims, 2 Drawing Sheets

REMOTE CONTROL CODES

FIELD OF THE INVENTION

The invention relates to an apparatus for supplying codes for remotely controlling devices, and also relates to a remote control system comprising the apparatus, to a method for supplying codes for remotely controlling devices, to a computer program product to be run via a computer for performing the method, and to a medium for storing and comprising the computer program product.

Examples of such a remote control system are universal remote control units, and examples of such devices are consumer products and non-consumer products.

BACKGROUND OF THE INVENTION

U.S. Pat. No. 6,008,735 discloses a method and system for programming a remote control unit to control the operation of a controllable device.

SUMMARY OF THE INVENTION

It is an object to provide an apparatus for supplying codes for remotely controlling devices.

Further objects are to provide a remote control system, a method, a computer program product and a medium.

A first aspect of the invention provides an apparatus for supplying codes for remotely controlling devices, the codes defining functions to be performed by the devices, a code-set comprising a function-code-combination for each one of two or more different functions, at least one of the different functions being a main-function and at least one other of the different functions being a sub-function, and the code-set forming part of a group of code-sets for a target device in case a code of a function-code-combination for the main-function is valid for the target device. So, under a condition that a code of a function-code-combination for a main-function is valid for the target device, a code-set is allocated to a group of one or more code-sets.

Examples of the functions to be performed by the devices are power on/off, digit, text, input, menu, back, mute, channel up/down, volume up/down etc. A valid code is a code that works for the target device (in other words a valid code is a code that results in the main-function being performed) and a non-valid code is a code that does not work for the target device (in other words a non-valid code is a code that does not result in the main-function being performed). By distinguishing between a main-function and sub-functions, different first and second functions are distinguished from each other. The different first and second functions are for example more and less important functions or more and less discriminating functions or other kinds of different functions. Code-sets each comprising two or more function-code combinations are grouped in dependence of their codes that define the main-function. So, in dependence of these main-codes being valid for the target device or not, a large number of function-code-combinations is divided into several groups. Each one of these groups comprises a smaller number of function-code-combinations. A first group for example comprises all function-code-combinations of all code-sets comprising a valid code that defines the main-function. A second group for example comprises all function-code-combinations of all code-sets comprising a non-valid code that defines the main-function. Owing to the fact that the first group comprises the code that allows the main-function to be performed by the target device and that the second group comprises a code that does not allow the main-function to be performed by the target device, the first group is more interesting for the target device. As a result, the large number of function-code-combinations available for the target device has been reduced, and the apparatus can supply those codes, that are possibly interesting for the target device, more efficiently.

It is not to be excluded that different codes each defining one and the same main-function are valid for the target device. So, these codes do for example not need to be identical bit by bit, fuzzy matches are allowed, what's important is that each one of these codes works for the target device. Instead of using one of the different functions as a main-function and using all others of the different functions as sub-functions, it is not to be excluded that two or more of the different functions are used as main-functions and all others of the different functions are used as sub-functions. Different code-sets may comprise a function-code-combination for different numbers of different functions.

According to an embodiment, an apparatus is defined by the group of code-sets forming a tree, the main-function and a code or codes defining the main-function forming a root of the tree, the sub-function forming a branch of the tree and a code or codes defining the sub-function forming a leaf of the branch. Usually, a tree comprises a root with several branches and with several leaves per branch. Other constructions than trees are however not to be excluded, such as a pyramid and a river bedding (a river delta).

According to an embodiment, an apparatus is defined by the group of code-sets being defined for a particular device-type and/or a particular device-brand. This way, the group of code-sets can be further reduced, and the apparatus can supply those codes, that are possibly interesting for the target device, even more efficiently.

According to an embodiment, an apparatus is defined by the apparatus comprising a database, and the group of code-sets being stored in a group of mutually linked fields in the database. This group of mutually linked fields for example defines the root of the tree and its branches and its leaves per branch.

According to an embodiment, an apparatus is defined by the apparatus comprising a processor for creating the group of code-sets and further comprising a memory for storing the group of code-sets. This processor for example groups the code-sets in dependence of their codes that define the main-function. So, in dependence of these main-codes being valid for the target device or not, a large number of function-code-combinations is divided into several groups etc.

According to an embodiment, an apparatus is defined by the main-function being pre-stored and/or being selectable by a user. According to a first option, the main-function may be pre-defined and pre-stored. According to a second option, a user may select which function(s) is(are) considered to be the main-function(s).

According to an embodiment, an apparatus is defined by the main-function being a power on/off function for switching the power on/off of the target device. The power on/off function is one of the functions that cannot be spared easily. Such a power on/off function may be a discrete function or a toggle function or another function.

According to an embodiment, an apparatus is defined by the codes being infrared codes destined for the devices. Other kinds of codes such as radio frequency codes are not to be excluded.

A second aspect of the invention provides a remote control system comprising the apparatus as defined above, the remote control system further comprising a transmitter for transmitting the codes to the devices. Such a remote control system may be a single remote control unit or may comprise two or more interacting remote control parts.

According to an embodiment, a remote control system is defined by the remote control unit further comprising a controller for controlling the transmitter for automatically transmitting the codes of the group of code-sets to the target device and further comprising a receiver for receiving a signal from a user or from the target device, the signal indicating one or more of the codes being valid for the target device. This way, the remote control system is programmed to control the target device.

According to an embodiment, a remote control system is defined by the remote control system further comprising a programmable part for mapping a key or another input to a particular function-code combination. This key or other kind of input does not necessarily need to be pre-destined for a particular function. So, it is not to be excluded that a key or another input destined for a first function is mapped to a function-code combination defining a completely different second function.

According to an embodiment, a remote control system is defined by the controller having a first generation mode for generating the codes at a first speed and having a jump back mode for jumping back a number of generated codes in response to a reception of the signal and having a second generation mode for generating the codes at a second speed that is more slowly than the first speed. These modes will further increase an efficiency of the remote control system.

It should be noted that a remote control system comprising a controller with generation and jump back modes may be realized independently from the apparatus as defined above. In other words, a remote control system comprising a controller with generation and jump back modes does not necessarily require a code-set to be allocated to a group of code-sets for a target device under the condition that a code of a function-code-combination for a main-function is valid for a target device.

A third aspect of the invention provides a method for supplying codes for remotely controlling devices, the codes defining functions to be performed by the devices, a code-set comprising a function-code-combination for each one of two or more different functions, one of the different functions being a main-function and the other ones of the different functions being sub-functions, the method comprising a step of allocating a code-set to a group of code-sets for a target device in case a code of a function-code-combination for the main-function is valid for the target device.

A fourth aspect of the invention provides a computer program product to be run via a computer for performing a method as defined above.

A fifth aspect of the invention provides a medium for storing and comprising the computer program product as defined above.

Embodiments of the remote control system and of the method and of the computer program product and of the medium correspond with the embodiments of the apparatus.

An insight might be that one or more of the functions to be performed by the devices to be controlled are more important or more discriminating than other functions or are otherwise different from the other functions. A basic idea might be that main-functions and sub-functions are to be distinguished from each other and might further be that code-sets each comprising two or more function-code combinations are to be grouped in dependence of their codes that define the main-function(s).

The invention solves a problem to provide an apparatus for supplying codes for remotely controlling devices. The invention is advantageous in that the apparatus can supply the codes more efficiently.

These and other aspects of the invention are apparent from and will be elucidated with reference to the embodiment(s) described hereinafter.

DETAILED DESCRIPTION

Figure 1:
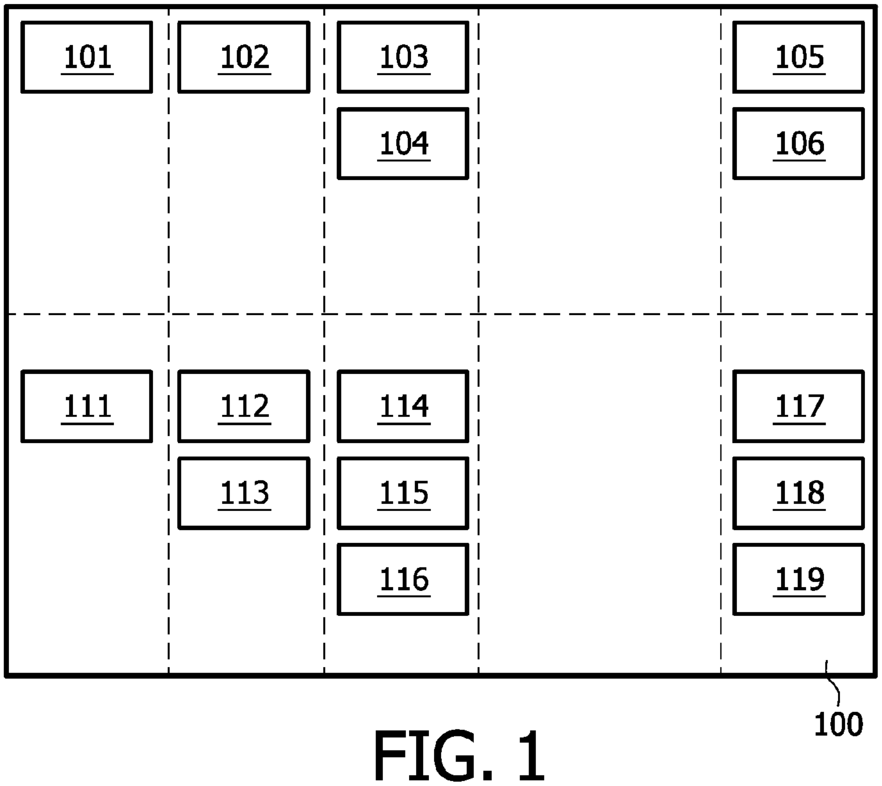
FIG. 1 shows a first embodiment of an apparatus in the form of a database.

A remote control system such as a universal remote control unit for example comprises the following five code-collections, each code-collection defining a code C per function F1-F10 (first table):

| | | | | | | | | | |
|---|---|---|---|---|---|---|---|---|---|
| F1 | C1 | F1 | C21 | F1 | C21 | F1 | C1 | F1 | C1 |
| F2 | C2 | F2 | C22 | F2 | C32 | F2 | C2 | F2 | C2 |
| F3 | C3 | F3 | C23 | F3 | C23 | F3 | C13 | F3 | C13 |
| F4 | C4 | F4 | C24 | F4 | C34 | F4 | C4 | F4 | C14 |
| F5 | C5 | F5 | C25 | F5 | C25 | F5 | C15 | F5 | C5 |
| F6 | C6 | F6 | C26 | F6 | C36 | F6 | C6 | F6 | C16 |
| F7 | C7 | F7 | C27 | F7 | C27 | F7 | C17 | F7 | C17 |
| F8 | C8 | F8 | C28 | F8 | C38 | F8 | C18 | F8 | C18 |
| F9 | C9 | F9 | C29 | F9 | C29 | F9 | C9 | F9 | C9 |
| F10 | C10 | F10 | C30 | F10 | C40 | F10 | C20 | F10 | C10 |

The function F1 is for example a power on/off function, the function F2 is for example a digit function, the function F3 is for example a text function, the function F4 is for example an input function, the function F5 is for example a menu function, the function F6 is for example a back function, the function F7 is for example a mute function, the function F8 is for example a channel up/down function etc. These functions are to be performed by devices to be controlled by the universal remote control unit in response to receptions of (infrared or other kinds of) codes transmitted by the universal remote control unit.

Owing to the fact that there are many devices of different types and brands, a universal remote control unit comprises many different code-collections. A user of the universal remote control unit has to find out which code-collection offers the best control per device.

According to the example disclosed in the first table, five different code-collections comprising fifty function-code-combinations have to be checked. This is a relatively inefficient solution, owing to the fact that for a target device that accepts the function-code-combination F1-C1, the function-code-combination F1-C21 will probably not be accepted. In other words, the first, fourth and fifth code-collections might be suitable for the target device, and the second and third code-collections are probably not.

According to the invention, a relatively efficient solution is offered, in that code-sets are grouped that comprise a function-code-combination for each one of two or more different functions. Thereby, at least one of the different functions is defined to be a main-function and at least one other of the different functions is defined to be a sub-function. A code-set forms part of a group of code-sets for a target device in case a code of a function-code-combination for the main-function is valid for the target device. The example disclosed in the first table then becomes (second table):

| | | | | |
|---|---|---|---|---|
| | | F2 | C2 | |
| | | F3 | C3 | C13 |
| | | F4 | C4 | C14 |
| | | F5 | C5 | C15 |
| F1 | C1 | F6 | C6 | C16 |
| | | F7 | C7 | C17 |
| | | F8 | C8 | C18 |
| | | F9 | C9 | |
| | | F10 | C10 | C20 |

The example disclosed in the second table only comprises seventeen function-code-combinations that need to be checked. The reduction from fifty to seventeen function-code-combinations is a great improvement of the efficiency. In this example as disclosed in the second table, the function F1 being a power on/off function has been defined to be a main-function and all other functions F2-F10 are considered to be sub-functions, but an other function and/or more than one function may be defined to be a main-function.

Another way of looking at the example disclosed in the second table is that the group of code-sets forms a tree. The main-function F1 and a code C1 defining the main-function F1 form a root of the tree. The sub-functions F2-F10 form branches of the tree, and a code or codes defining a sub-function form a leaf of this branch (C2 for F2, C3 and C13 for F3, C4 and C14 for F4, C5 and C15 for F5, C6 and C16 for F6, C7 and C17 for F7, C8 and C18 for F8, C9 for F9, and C10 and C20 for F10).

To further improve the efficiency, the group of code-sets may be defined for a particular device-type and/or a particular device-brand. Thereto, a user might need to select and/or enter the device-type and/or the device-brand of the target device.

A first possible realization of an apparatus that forms part of a remote control system is shown in the FIG. 1. This is a first embodiment of an apparatus that is here in the form of a database 100. The group of code-sets is stored in a group of mutually linked fields 101-106, 111-119 in the database 100. In a first row, in a first column, a first field 101 defines a first function-code-combination (for example F1-C1) comprising a first function (the main-function, for example F1). Thereto, for example the entire first function-code-combination is stored in the first field 101, or only the code of the first function-code-combination is stored in this first field 101, whereby the first column is indicating the first function of the first function-code-combination.

In the first row, in a second column, a second field 102 defines a second function-code-combination (for example F2-C2) comprising a second function (a sub-function, for example F2). Thereto, for example the entire second function-code-combination is stored in the second field 102, or only the code of the second function-code-combination is stored in this second field 102, whereby the second column is indicating the second function of the second function-code-combination.

In the first row, in a third column, a third field 103 defines a third function-code-combination (for example F3-C3) comprising a third function (a sub-function, for example F3) and a fourth field 104 defines a fourth function-code-combination (for example F3-C13) comprising the third function (a sub-function, for example F3). Thereto, for example the entire third (fourth) function-code-combination is stored in the third (fourth) field 103 (104), or only the code of the third (fourth) function-code-combination is stored in this third (fourth) field 103 (104), whereby the third column is indicating the third function of the third (fourth) function-code-combination.

In the first row, in a last column, a sixteenth field 105 defines a sixteenth function-code-combination (for example F10-C10) comprising a tenth function (a sub-function, for example F10) and a seventeenth field 106 defines a seventeenth function-code-combination (for example F10-C20) comprising the tenth function (a sub-function, for example F10). Thereto, for example the entire sixteenth (seventeenth) function-code-combination is stored in the sixteenth (seventeenth) field 105 (106), or only the code of the sixteenth (seventeenth) function-code-combination is stored in this sixteenth (seventeenth) field 105 (106), whereby the last column is indicating the tenth function of the sixteenth (seventeenth) function-code-combination.

Similarly, in a second row, in a first column, a field 111 defines a further first function-code-combination of another tree (for example F1-C21) comprising a first function (the main-function, for example F1). Thereto, for example the entire further first function-code-combination is stored in the field 111, or only the code of the further first function-code-combination is stored in this first field 111, whereby the first column is indicating the first function of the further first function-code-combination.

In the second row, in a second column, a field 112 defines a further second function-code-combination of the other tree (for example F2-C22) comprising a second function (a sub-function, for example F2) and a field 113 defines a further third function-code-combination of the other tree (for example F2-C32) comprising the second function (a sub-function, for example F2). In the second row, in a third column, a field 114 (115, 116) defines a further fourth (fifth, sixth) function-code-combination of the other tree comprising a fourth function. In the second row, in a last column, a field 117 (118, 119) defines yet further function-code-combinations of the other tree etc.

Figure 2:
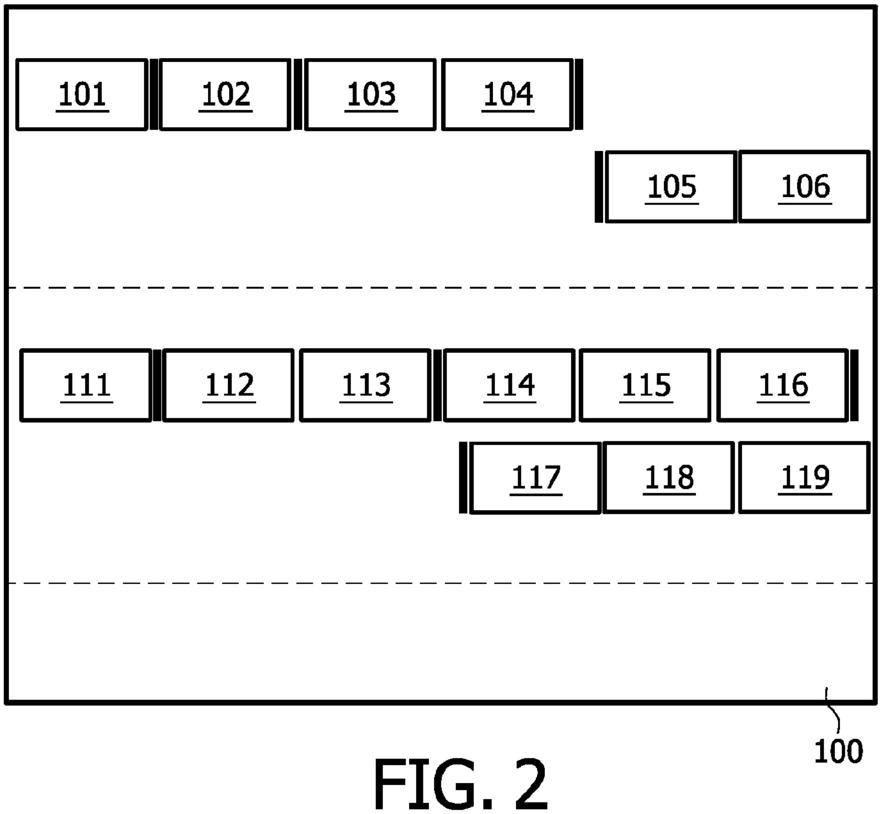
FIG. 2 shows a second embodiment of an apparatus in the form of a database.

A second possible realization of an apparatus that forms part of a remote control system is shown in the FIG. 2. This is a second embodiment of an apparatus that is here in the form of a database 100. The group of code-sets is stored in a group of mutually linked fields 101-106, 111-119 in the database 100. In a first row, a first field 101 defines a first function-code-combination (for example F1-C1) comprising a first function (the main-function, for example F1). Thereto, for example the entire first function-code-combination is stored in the first field 101, or only the code of the first function-code-combination is stored in this first field 101, whereby the first field separation following the first field 101 is indicating that this function is the first function of the first function-code-combination.

In the first row, after the first field separation, a second field 102 defines a second function-code-combination (for example F2-C2) comprising a second function (a sub-function, for example F2). Thereto, for example the entire second function-code-combination is stored in the second field 102, or only the code of the second function-code-combination is stored in this second field 102, whereby the first field separation following the first field 101 or the second field separation following the second field 102 is indicating that this function is the second function of the second function-code-combination.

In the first row, after the second field separation, a third field 103 defines a third function-code-combination (for example F3-C3) comprising a third function (a sub-function, for example F3) and a fourth field 104 defines a fourth function-code-combination (for example F3-C13) comprising the third function (a sub-function, for example F3). Thereto, for example the entire third (fourth) function-code-combination is stored in the third (fourth) field 103 (104), or only the code of the third (fourth) function-code-combination is stored in this third (fourth) field 103 (104), whereby the previous or coming field separation is indicating that this function is the third function of the third (fourth) function-code-combination.

In the first row, a sixteenth field 105 defines a sixteenth function-code-combination (for example F10-C10) comprising a tenth function (a sub-function, for example F10) and a seventeenth field 106 defines a seventeenth function-code-combination (for example F10-C20) comprising the tenth function (a sub-function, for example F10). Thereto, for example the entire sixteenth (seventeenth) function-code-combination is stored in the sixteenth (seventeenth) field 105 (106), or only the code of the sixteenth (seventeenth) function-code-combination is stored in this sixteenth (seventeenth) field 105 (106), whereby the previous field separation is indicating that this function is the tenth function of the sixteenth (seventeenth) function-code-combination. Similarly, in a second row, fields 111-119 etc.

Mutually linked fields are for example sub-fields of a larger field or are for example subsequent fields with subsequent field numbers or are for example fields with mutually linked field numbers or are for example fields whereby another mechanism takes care of mutually linking these fields.

Figure 3:
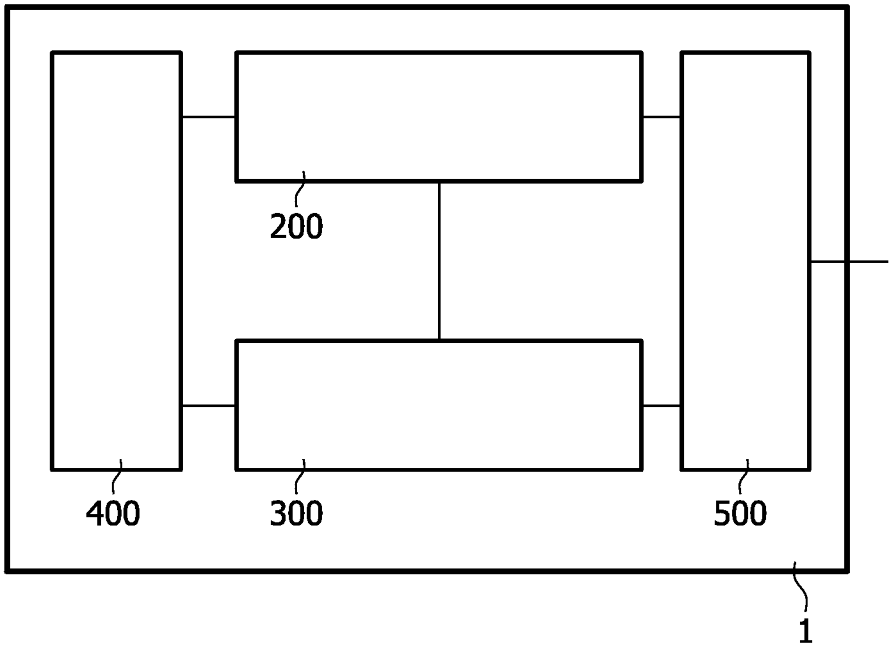
FIG. 3 shows a third embodiment of an apparatus comprising a processor and a memory.

A third possible realization of an apparatus 1 that forms part of a remote control system is shown in the FIG. 3. This is a third embodiment of an apparatus 1 that comprises a processor 200 for creating the group of code-sets and a memory 300 for storing the group of code-sets. The processor 200 and the memory 300 are coupled to each other and are each further coupled to an input interface 400 and to an output interface 500. The processor 200 creates the group of code-sets as described for the first and second tables and for the FIGS. 1 and 2. The memory 300 may partly or entirely correspond with the database 100 or not.

Figure 4:
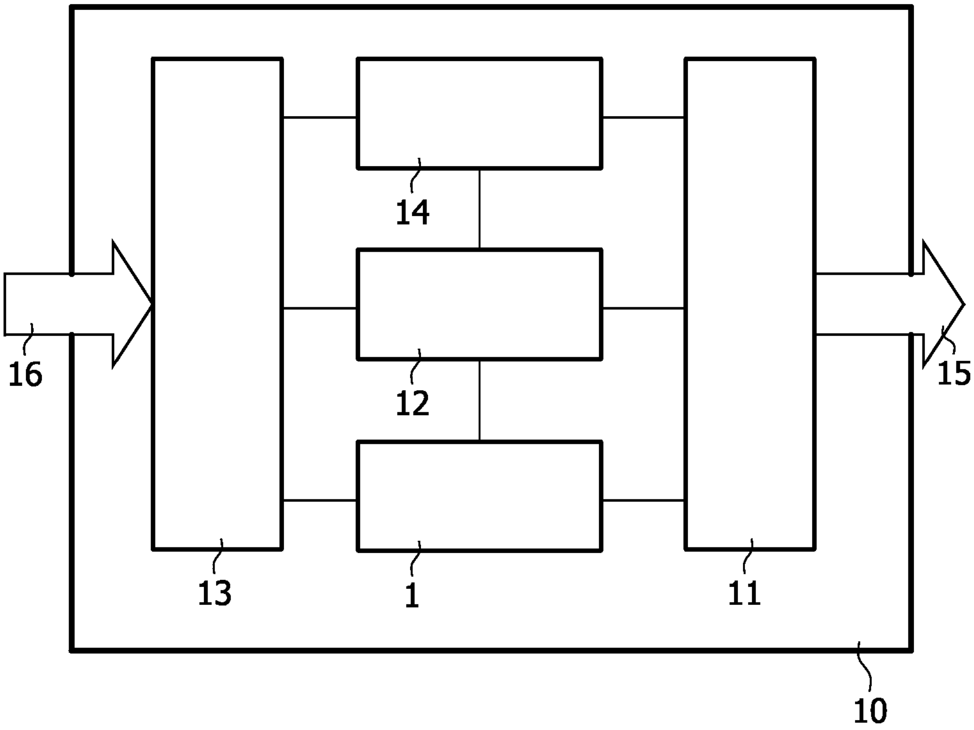
FIG. 4 shows an embodiment of a remote control system.

In the FIG. 4, an embodiment of a remote control system 10 is shown comprising the apparatus 1. This remote control system 10 is in the form of a remote control unit, but alternatively the remote control system 10 may comprise two or more interacting remote control parts, such as for example (not shown) a first hand-held-part and a second target-device-part etc. The remote control system 10 further comprises a transmitter 11 coupled to the apparatus 1 for transmitting the codes to the devices via an output 15. The remote control system 10 may further comprise a controller 12 coupled to the apparatus 1 and to the transmitter 11 for controlling the transmitter 11 for automatically transmitting the codes of the group of code-sets to the target device for determining which codes are valid for this target device. This way, the remote control system 10 can be programmed to control the target device. The remote control system 10 may further comprise a receiver 13 coupled to the apparatus 1 and to the controller 12 for receiving a signal from a user or from the target device via an input 16. This signal indicates one or more of the transmitted codes being valid for the target device. The remote control system 10 may further comprise a programmable part 14 such as a man-machine-interface for mapping a key or another input to a particular function-code combination. Such a man-machine-interface may take the place of the receiver 13 for receiving the signal from the user. This key or other kind of input does not necessarily need to be pre-destined for a particular function. So, it is not to be excluded that a key or another input destined for a first function is mapped to a function-code combination defining a completely different second function. Preferably, the controller 12 has a first generation mode for generating the codes at a first speed and has a jump back mode for jumping back a number of generated codes in response to a reception of the signal and has a second generation mode for generating the codes at a second speed that is more slowly (less fast) than the first speed. During the first generation mode, the user cannot react in due time, but this doesn't matter as long as the generated codes are not valid. When a generated code appears to be valid, the user reacts too late, and this results in the jump back mode. Then a pre-defined number of recently generated codes are generated again, but now at a lower speed, that allows the user to react in due time.

The main-function may be pre-stored and/or may be selectable by the user. In the FIG. 4, of the apparatus 1, the processor 200 is coupled to the controller 12. Alternatively, the processor 200 and the controller 12 may form part of an integrated solution. The input interface 400 is for example coupled to the receiver 13 (alternatively, one of them may form part of the other, explicitly or implicitly) or is for example coupled (not shown) to the man-machine-interface (alternatively, one of them may form part of the other, explicitly or implicitly) or to the controller 12 (alternatively, one of them may form part of the other, explicitly or implicitly) and the output interface 500 is for example coupled to the transmitter 11 (alternatively, one of them may form part of the other, explicitly or implicitly) or is for example coupled (not shown) to the man-machine-interface or to the controller 12. So, alternative constructions and alternative couplings are not to be excluded.

The code-collections disclosed in the first table do often not allow an optimum solution to be found, owing to the fact that per code-collection one or more of the function-code-combinations will often not work for the target device. Compared to these code-collections, the creation of a group of code-sets for a target device for which group the main-code defining the main-function is valid for the target device will at least offer a larger chance to find an optimum solution, owing to the fact that several code-sets are combined.

A tree-based database or processor/memory combination or remote control unit can be built from scratch, created from any existing database, or generated from a traditional code-collection-based database. This can be done design-time or run-time.

Firstly, one or multiple main-functions that are to be used as a root or roots of the tree are to be selected and/or generated. Then the tree or trees are to be computed for a brand/device combination, for a device, for a brand, or over a full database. For example an algorithm iterates over all code-collections for the brand/device combination, for the device, for the brand, or over the full database. For each unique main-code for the main-function, a tree is computed. Thereby it must be noted that two codes are considered to be equal if they have the same effect on the target device. So although, they aren't bit-wise the same, they still can be 'the same' ('fuzzy match'). One or multiple code-collections will be mapped onto a tree. When multiple trees exist, an order may be given to these trees. This could be based on the order of the code-collections that have been used or on another kind of priority.

Then for example an algorithm iterates over all these code-collections that will be mapped into the single tree. Each sub-function is a branch of the tree. For each sub-function, its code is added as a leaf to the branch. If two codes are similar (bit-wise or fuzzy), only one code will be added to the branch in the tree. If they are different each unique one will be added. A weighing algorithm may be used to give weight to the multiple codes. For example, the code that comes out of the highest-priority code-collection may get the highest weight, or the numbers of prevalence of each unique code may be counted and the counting results may be weighted. This all may be repeated for all different trees for the brand/device combination.

To set-up a universal remote control unit, a user may switch this control unit into a programming mode. This can be done by pressing a key (combination), using the menu on a screen, etc. Then the user may for example select for what device and brand the control unit is to be configured. Depending on the form-factor of the control unit there can be different ways of doing this. For example an algorithm iterates over all trees for the chosen brand/device combination, and the main-code defining the main-function is sent out. Either the user or the control unit has to check whether the target device has reacted to the transmission of the main-code. Then this tree may be installed into the control unit. The key corresponding to the tree's main-code (main-function for example power on/off) will now certainly work. Consequently, all other sub-functions of the tree have to be checked. If there is only one code as a leaf, this code has to be installed. If a certain sub-function has multiple codes as leaves, either one with the highest priority is to be installed or one or more with a higher priority than others may be installed (for example in case the control unit is capable of transmitting two or more codes per function shortly after one another).

It may need to be tested if all keys work or not. If they don't work, this may be indicated. There can be different ways to indicate this. On a control unit having a liquid crystal display screen, this screen can be used. Another way of indicating this is pressing-and-holding the non-working (or incorrectly working) key. Then, for example an algorithm iterates over all possible codes of the function corresponding to the user-indicated key (this can be a hard-key or soft-key), and the code is sent. When the user has indicated that the code worked, that code is installed under this key.

Alternatively, for example an algorithm can not only iterate over codes for a given (sub-) function, but can also iterate over codes for related (sub-) functions. For example, in case the user cannot find a satisfying code, it might be that a code from a different (sub-) function would be a better. To do so, the control unit may implement what different (sub-) functions may be mapped to a specific key. For example functions like 'Program', 'Show-view' and 'Timer' are different functions with a similar effect. If there is just one 'Program' key on a control unit, the user might expect any of these to work. Sometimes there is no key for an important function, and at the same time there are keys that won't work for a specific device. For example in case the user's TV has "Ambilight", it might be allowed to put the "Ambilight" function under for example the 'Tele-text OFF' key.

Summarizing, according to an embodiment and without excluding further embodiments, in an apparatus 1, such as a database or a processor/memory combination of a remote control unit 10, for supplying for example infrared codes defining functions for remotely controlling devices, code-sets comprise function-code-combinations for each one of two/more different functions. By distinguishing main-functions such as power on/off and sub-functions such as channel up/down and volume up/down, code-sets can be allocated to a group of code-sets for a target device in case a code of a function-code-combination for the main-function is valid for the target device. This increases an efficiency of the apparatus 1. The group of code-sets may form a tree, whereby the main-function and its code(s) form a root of the tree, whereby a sub-function forms a branch of the tree and a code or codes defining this sub-function form a leaf or leaves of the branch. The group of code-sets may be defined for device-types and/or device-brands.

While the invention has been illustrated and described in detail in the drawings and foregoing description, such illustration and description are to be considered illustrative or exemplary and not restrictive; the invention is not limited to the disclosed embodiments. For example, it is possible to operate the invention in an embodiment wherein different parts of the different disclosed embodiments are combined into a new embodiment.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An apparatus for supplying codes for remotely controlling devices, the codes defining functions to be performed by the devices, the apparatus comprising a code-set including a function-code-combination for each one of two or more different functions, at least one of the different functions being a main-function and at least one other of the different functions being a sub-function, the code-set including only one code for the at least one of the different functions, at least two different codes for the at least one other of the different functions and forming part of a group of code-sets for a target device in case a code of a function-code-combination for the main-function is valid for the target device.

2. The apparatus as defined in claim 1, the group of code-sets forming a tree, the main-function and a code or codes defining the main-function forming a root of the tree, the sub-function forming a branch of the tree and a code or codes defining the sub-function forming a leaf of the branch.

3. The apparatus as defined in claim 1, the group of code-sets being defined for a particular device-type and/or a particular device-brand.

4. The apparatus as defined in claim 1, the apparatus comprising a database, and the group of code-sets being stored in a group of mutually linked fields in the database.

5. The apparatus as defined in claim 1, the apparatus comprising a processor for creating the group of code-sets and further comprising a memory for storing the group of code-sets.

6. The apparatus as defined in claim 1, the main-function being pre-stored and/or being selectable by a user.

7. The apparatus as defined in claim 1, the main-function being a power on/off function for switching the power on/off of the target device.

8. The apparatus as defined in claim 1, the codes being infrared codes destined for the devices.

9. A remote control system comprising an apparatus including codes for remotely controlling devices, the codes defining functions to be performed by the devices, a code-set including a function-code-combination for each one of two or more different functions, at least one of the different functions being a main-function and at least one other of the different functions being a sub-function, the code-set further including only one code for the at least one of the different functions, at least two different codes for the at least one other of the different functions and forming part of a group of code-sets for a target device in case a code of a function-code-combination for the main-function is valid for the target device; and a transmitter for transmitting the codes to the devices.

10. The remote control system as defined in claim 9, further comprising a controller for controlling the transmitter for automatically transmitting the codes of the group of code-sets to the target device; and a receiver for receiving a signal from a user or from the target device, the signal indicating one or more of the codes being valid for the target device.

11. The remote control system as defined in claim 10, further comprising a programmable part for mapping a key or another input to a particular function-code combination.

12. The control system as defined in claim 10, the controller having a first generation mode for generating the codes at a first speed and having a jump back mode for jumping back a number of generated codes in response to a reception of the signal and having a second generation mode for generating the codes at a second speed that is slower than the first speed.

13. A method for storing codes in a non-transitory memory medium for remotely controlling devices, the codes defining functions to be performed by the devices, the method comprising acts of organizing a code-set including, a function-code-combination for each one of two or more different functions, at least one of the different functions being a main-function and at least one other of the different functions being a sub-function; grouping the code-set to include only one code for the at least one of the different functions and at least two different codes for the at least one other of the different functions; and allocating a code-set to a group of code-sets for a target device in case a code of a function-code-combination for the main-function is valid for the target device.

14. A computer program product stored on a non-transitory memory medium to be run via a computer for performing a method for supplying codes for remotely controlling devices, the codes defining functions to be performed by the devices, the method comprising acts of organizing a code-set including a function-code-combination for each one of two or more different functions, at least one of the different functions being a main-function and at least one other of the different functions being a sub-function with the code-set grouped to include only one code for the at least one of the different functions and at least two different codes for the at least one other of the different functions; and allocating a code-set to a group of code-sets for a target device in case a code of a function-code-combination for the main-function is valid for the target device.

15. A non-transitory computer readable medium comprising codes for remotely controlling devices, the codes defining functions to be performed by the device, the codes organized into at least one code-set including a function-code-combination for each one of two or more different functions, at least one of the different functions being a main-function and at least one other of the different functions being a sub-function, and including only one code for the at least one of the different functions and at least two different codes for the at least one other of the different functions.

16. A remote control system comprising an apparatus including codes for remotely controlling devices, the codes defining functions to be performed by the devices, a code-set including a function-code-combination for each one of two or more different functions, at least one of the different functions being a main-function and at least one other of the different functions being a sub-function, the code-set further including only one code for the at least one of the different functions, at least two different codes for the at least one other of the different functions and forming part of a group of code-sets for a target device in case a code of a function-code-combination for the main-function is valid for the target device; a transmitter for transmitting the codes to the devices; and a controller for controlling the transmitter to transmit the codes of the group of code-sets to the target device, the controller having a first generation mode for generating the codes at a first speed and having a jump back mode for jumping back a number of generated codes in response to a reception of the signal and having a second generation mode for generating the codes at a second speed that is slower than the first speed.

17. The apparatus as defined in claim 1, comprising a transmitter for transmitting the codes to the devices; and a controller for controlling the transmitter to transmit the codes of the group of code-sets to the target device, the controller having a first generation mode for generating the codes at a first speed and having a jump back mode for jumping back a number of generated codes in response to a reception of a signal indicating one or more of the codes being valid for the target device and having a second generation mode for generating the codes at a second speed that is slower than the first speed.

18. The method as defined in claim 13, comprising acts of transmitting the codes of the group of code-sets to the target device in a first generation mode for generating the codes at a first speed and having a jump back mode for jumping back a number of generated codes in response to a reception of a signal indicating one or more of the codes being valid for the target device; and transmitting the codes of the group of code-sets to the target device in a second generation mode for generating the codes at a second speed that is slower than the first speed.

19. The computer program product as defined in claim 14, the method comprising acts of transmitting the codes of the group of code-sets to the target device in a first generation mode for generating the codes at a first speed and having a jump back mode for jumping back a number of generated codes in response to a reception of a signal indicating one or more of the codes being valid for the target device; and transmitting the codes of the group of code-sets to the target device in a second generation mode for generating the codes at a second speed that is slower than the first speed.

* * * * *